Patented Oct. 8, 1935

2,016,530

UNITED STATES PATENT OFFICE 2,016,530

MANUFACTURE OF BARIUM HYDRATE

Robert Erwin Windecker, Painesville, Ohio

No Drawing. Application February 28, 1934,
Serial No. 713,381

15 Claims. (Cl. 23—186)

This invention relates principally to conversion of impure barium carbonate to relatively pure barium hydrate. The process has been developed with particular reference to the sugar refining industry and will be described in that connection, although it is not limited to that field and, as will be pointed out, is susceptible, in certain phases, to other special uses, and to general purposes.

As is well known, sucrose may be recovered by treating molasses with barium hydrate. Barium saccharate is formed by the reaction of the barium hydrate with the sucrose content of the molasses and is separated out and broken down by carbonation to yield barium carbonate and sucrose. The barium carbonate thus obtained is treated to recover the barium as the hydrate for reuse. In this process, the barium to be converted to the hydrate has picked up various organic and inorganic impurities of which sulfur compounds are particularly troublesome.

The object of my invention, broadly stated, is to provide improvements in the art of converting such barium carbonate and other impure barium carbonates, such, for example, as witherite, which I prefer to add to make up for losses of barium in the process, to substantially pure barium hydrate, free from soluble sulfur compounds.

A further object is to accomplish the conversion in good yield by a very simple continuous process consisting of a single heating and a single lixiviation.

Other and more specific objects will become apparent from the following description and claims.

In view of the presence, in the barium carbonate to be converted, of various impurities such as sulfates from the organic material and the witherite, phosphates, potash, lime and iron compounds, considerable difficulty has been encountered in reducing the process to the desired simplicity. I have found that it will not do simply to heat the impure barium carbonate to such a temperature as to produce barium oxide. The impurities have a powerful fusing action which not only would give a hard, well-nigh unworkable melt but would stick to the kiln and attack and destroy the lining. Neither is it possible to secure good results by the ordinary method of heating in a reducing atmosphere in the presence of reducing agents. The resulting product would contain sulfur compounds in the reduced state, e. g. barium sulfide. The iron usually present as an impurity would also be reduced and on lixiviation the product would contain barium sulfide and sulfhydrate and soluble iron-sulfur compounds which would render the product unfit for use in refining sugar and for many other purposes.

It has, in fact, been found necessary to avoid the fusing action of the impurities, to minimize or malt in an incipient state the fusing of the barium carbonate itself while being converted to the oxide and to eliminate sulfides and other soluble reduced sulfur compounds from the final clinker.

To accomplish these results in a simple, continuous process involving minimum temperatures and economical operation, I follow a procedure which will now be described generally and illustrated by specific examples.

The impure barium carbonate is intimately mixed with carbonaceous material and lime, limestone or calcium hydrate as by grinding and the mixture is heated in an open rotary kiln to a temperature sufficiently high to cause conversion of barium carbonate to the oxide. The atmosphere of the kiln at the end at which the mixture enters may be reducing, neutral or slightly oxidizing, but the region through which the material passes prior to discharge must be oxidizing for a sufficient distance to effect oxidation of reduced sulfur compounds present and excesses of carbon remaining whereby no soluble sulfur compounds will be present in the resulting clinker.

In carrying out the process on a large scale without departing from the scope of the invention, it may be advantageous to pass the material through a kiln having a non-oxidizing atmosphere, then through another kiln having an oxidizing atmosphere.

The invention is not limited to the use of a rotary kiln in carrying out the process, since the process may be worked in varying types of heating furnaces.

I have found in practice that the above-outlined procedure prevents the fusion effects of the impurities and mixtures of barium oxide and barium carbonate and results in a clinker composed essentially of an intimate mixture of calcium and barium oxides and free from soluble sulfur compounds. This clinker can be put to certain uses independent of the sugar industry and production of barium hydrate in general, which is itself a valuable product. When lixiviated with water, it readily disintegrates and the barium oxide is converted into soluble barium hydrate which can be readily filtered off from the insoluble calcium hydrate and other insoluble matter in a suitable condition and state of purity for use in sugar refining or for other purposes. The calcium hydrate may also be reused for subsequent purification of the reused impure barium carbonate.

It will thus be seen that my process is simple, economical and effective for use in sugar refining and for other purposes and the following practical examples are given to illustrate it more in detail.

*Example I.*—100 parts by weight of barium carbonate, 90–120 parts limestone, 25–35 parts carbon, are ground together to a fineness passing a 100-mesh sieve or finer. After grinding, the mixture is moistened and briquetted into small briquets and calcined in an open, rotary kiln which is heated to about 2600–2800° F., the atmosphere of which is regulated so that about the front or flame zone is on the oxidizing side of neutrality.

*Example II.*—100 parts by weight of barium carbonate, 100–140 parts limestone, 25–40 parts carbon are ground to a fineness of about 200 mesh. The intimately ground materials are briquetted into small briquets and heated to about 2700–2800° F. in an open rotary kiln in which the heating flame is oxidizing.

*Example III.*—100 parts—dry basis—returned sludge from clinker leaching, about 30–35 parts barium carbonate, and about 18–25 parts carbon in intimate mixture and finely ground are briquetted and heated to about 2700° F. in an open rotary kiln in which the clinker contacts an oxidizing atmosphere while still at high temperature.

In the foregoing examples the quantities of materials given serve to illustrate the invention for the type of materials used; variations of these amounts remain within the scope of the process.

The lime material used may be calcium or magnesium carbonates, oxides or hydrates or dolomite or mixtures in any proportion, all of which assume the form of the oxide in the heating process, and the word "lime" as used herein should be read to include such compounds and mixtures. "Barium" is also to be read as including strontium. The reducing carbon used may be in any form such as, for example, by-product coke, petroleum coke, coal, etc.

The ground mixture of raw materials is preferably moistened and made into small briquets before the heating operation. The material may be introduced into the kiln in the powdered form. However, the briquetted or agglomerated form lessens dusting and minimizes premature combustion of the carbonaceous material present. The returned lime sludge, barium carbonate and carbon may be ground dry or together as a slurry, then formed into briquets or agglomerated and dried.

The effect of this process upon the barium sulfate constituent of the reaction materials forms per se no part of the present invention, but is fully described and claimed in my co-pending application, Serial Number 681,761, filed July 22, 1933.

While I have described my invention in considerable detail by way of illustration, I wish it understood that I am limited only in accordance with the appended claims and the prior art.

What I claim is:

1. The process which comprises subjecting an intimate mixture of carbonaceous material, lime and barium carbonate to a temperature sufficient to convert the barium carbonate to the oxide and subjecting the resulting material to an oxidizing atmosphere at an elevated temperature.

2. The process which comprises subjecting an intimate mixture of carbonaceous material, lime and sulfur-containing barium carbonate to a temperature sufficient to convert the barium carbonate to the oxide and subjecting the resulting material to an oxidizing atmosphere at an elevated temperature.

3. The process which comprises reacting upon barium carbonate containing impurities of the class consisting of impurities associated with witherite, sulfur containing compounds, potassium salts, phosphorous compounds and organic matter, with carbonaceous material in the presence of intimately admixed lime, and subjecting the resulting material to an oxidizing atmosphere at an elevated temperature.

4. The process which comprises heating barium carbonate containing impurities in the class consisting of impurities associated with witherite, sulfur containing compounds, potassium salts, phosphorous compounds and organic matter, with carbon in the presence of lime, the components being ground and intimately mixed, and subjecting the resulting material to an oxidizing atmosphere at an elevated temperature.

5. The process which comprises heating barium carbonate with a carbonaceous material in the presence of admixed lime, said barium carbonate containing as impurities one or more compounds of the group consisting of phosphates, potash, iron compounds, sulfur compounds and organic matter, and subjecting the resulting material to an oxidizing atmosphere at elevated temperature to consume carbon remaining and to convert sulfides still present in the mixture.

6. The process which comprises reacting upon barium carbonate containing impurities in the class consisting of impurities associated with witherite, sulfur containing compounds, potassium salts, phosphorous compounds and organic matter, with a carbonaceous material in the presence of intimately admixed lime at an elevated temperature, and subjecting the resulting material to an oxidizing atmosphere at an elevated temperature whereby to remove excess carbon and to decompose any sulfides still present in the mixture.

7. The process which comprises heating barium carbonate with a carbon material in the presence of admixed lime, said barium carbonate containing combined sulfur compounds as impurity and subjecting the resulting material at elevated temperature to an oxidizing atmosphere to remove excess carbon and decompose sulfides present in the reacted mixture.

8. The process which comprises heating impure barium carbonate with a carbonaceous material in the presence of intimately admixed lime, the mixture containing iron, sulfur, potash and phosphorus compounds and subjecting the resulting material at elevated temperature to oxidation by means of an oxidizing atmosphere to consume excess carbon and decompose sulfides present in the mixture.

9. The process which comprises subjecting an intimate mixture of carbonaceous material, lime and barium carbonate to a temperature of the order of 2600–2800° F. for a time sufficient to convert barium carbonate to oxide and subjecting the converted mixture to an oxidizing atmosphere at an elevated temperature.

10. The process which comprises subjecting an intimate mixture of carbonaceous material, lime and barium carbonate to a temperature of the order of 2600–2800° F. for a time sufficient to convert barium carbonate to oxide and by oxidation at elevated temperature removing excess carbon and decomposing soluble sulfur compounds.

11. The process which comprises briquetting a finely ground and intimate mixture of impure sulfate-containing barium carbonate, lime, and carbon, heating in a rotary kiln to a temperature sufficient to effect conversion of barium carbonate to barium oxide in an atmosphere of sufficient oxidizing power to oxidize any residual carbon and soluble sulfur compounds still present in the clinker.

12. The process which comprises heating a finely ground and intimate mixture of 100 parts barium carbonate, about 90–120 parts limestone and about 25–40 parts carbon to a temperature approximating 2600–2800° F. in a rotary kiln in which the heating flame is regulated to effect oxidation of any soluble sulfur compounds and excess carbon remaining in the clinker, without being so excessively oxidizing as to burn the carbon from the incoming carbon containing raw materials before the reducing reaction has taken place.

13. The process which comprises heating a compound selected from the group consisting of barium and strontium carbonate containing one or more impurities of the class comprising impurities associated with witherite, impurities associated with strontianite, lime, sulfur containing compounds, potassium salts, phosphorous compounds, organic matter, with carbonaceous material in the presence of admixed lime, said components being ground and mixed, and subjecting the resulting material to an oxidizing atmosphere at an elevated temperature.

14. The process of treating barium carbonate obtained by carbonation of barium saccharate which has been formed by reacting barium hydrate with sugar bearing material, said process comprising mixing and heating the barium carbonate so obtained with lime and carbonaceous material, said carbonaceous material being present in at least equimolecular proportion to the barium carbonate, and subjecting the resulting material to an oxidizing atmosphere before the heating operation is completed.

15. A process of manufacturing barium hydrate including the steps of forming an intimate mixture of barium carbonate containing impurities of the class consisting of impurities associated with witherite, sulfur containing compounds, potassium salts, phosphorous compounds and organic matter with lime and carbonaceous material and subjecting such mixture to a heating operation in which the mixture is subjected to an oxidizing atmosphere before completion of the heating, then lixiviating the resulting clinker whereby to remove barium hydrate therefrom and leave a sludge, said sludge containing lime, undecomposed barium carbonate and impurities, treating the barium carbonate formed by the steps of contacting said barium hydrate with sugar bearing material, carbonating the barium saccharate thus formed and separating the barium carbonate from the sugar solution, said treatment comprising mixing said barium carbonate with the said sludge, additional carbonaceous material, lime and witherite, said steps being performed repeatedly.

ROBERT ERWIN WINDECKER.